(12) United States Patent
Runkel

(10) Patent No.: US 7,766,136 B2
(45) Date of Patent: Aug. 3, 2010

(54) SUSPENSION ARRANGEMENT FOR MOTOR VEHICLES

(75) Inventor: Walter Runkel, Leubsdorf/Rhein (DE)

(73) Assignee: Hemscheidt Fahrwerktechnik GmbH & Co. KG, Hann-Gruiten (DE)

( * ) Notice: Subject to any disclaimer, the term of this patent is extended or adjusted under 35 U.S.C. 154(b) by 388 days.

(21) Appl. No.: 11/488,352

(22) Filed: Jul. 18, 2006

(65) Prior Publication Data

US 2007/0017760 A1    Jan. 25, 2007

(30) Foreign Application Priority Data

Jul. 18, 2005   (DE) .................. 20 2005 011 439 U

(51) Int. Cl.
*F16F 9/24* (2006.01)

(52) U.S. Cl. .................. 188/297; 188/304; 188/314; 267/64.25

(58) Field of Classification Search .......... 188/297, 188/298, 304, 313, 314; 267/64.16, 64.25, 267/218
See application file for complete search history.

(56) References Cited

U.S. PATENT DOCUMENTS

| | | |
|---|---|---|
| 1,116,293 A | 11/1914 | Kane |
| 1,290,293 A | 1/1919 | Morski |
| 1,397,879 A | 11/1921 | Pillmore |
| 1,470,931 A | 10/1923 | Perkins |
| 1,493,884 A | 5/1924 | Kreider |
| 1,500,277 A | 7/1924 | Selker |
| 2,038,032 A | 4/1936 | Flynn |
| 2,706,009 A | 4/1955 | Schramm |
| 3,085,796 A | 4/1963 | Wettstein |
| 3,285,617 A * | 11/1966 | Jackson .................. 267/64.16 |
| 3,677,141 A | 7/1972 | Lagerqvist et al. |
| 3,689,103 A | 9/1972 | Meulendyk |
| 3,840,245 A * | 10/1974 | Aikawa et al. ........... 267/64.25 |
| 3,921,746 A | 11/1975 | Lewus |
| 4,091,897 A | 5/1978 | Andrepont |
| 4,159,756 A | 7/1979 | Murakami et al. |
| 4,732,244 A | 3/1988 | Verkuylen |

(Continued)

FOREIGN PATENT DOCUMENTS

BE    375 994    1/1931

(Continued)

*Primary Examiner*—Thomas J Williams
(74) *Attorney, Agent, or Firm*—Brinks Hofer Gilson & Lione

(57) ABSTRACT

The invention relates to a suspension arrangement (1) for—loading-bearing and resilient wheel support in a motor vehicle, having at least one spring cylinder (2) with a piston (6) which is guided in a cylinder (4) such that it can be moved relative to the latter and which, on one side, has a piston rod (8) guided out of the cylinder (4) in the outward direction. The piston (6) separates, within the cylinder (4), a cylindrical working chamber (12) from an annular chamber (14), which encloses the piston rod (8). On the side of the working chamber (12), in order to generate a load-bearing spring force (F), the piston (6) acts counter to a working pressure (pA) of an elastically compressible, in particular pneumatic spring medium (FM). The piston rod (8) is telescopically variable in length via an additional spring cylinder (16), the additional spring cylinder (16) being subjected at least to a counterpressure (pG; pG1, pG2) of an elastically compressible, in particular pneumatic opposing spring medium (GM).

6 Claims, 5 Drawing Sheets

U.S. PATENT DOCUMENTS

| | | | | |
|---|---|---|---|---|
| 5,009,451 | A | * | 4/1991 | Hayashi et al. .......... 280/6.157 |
| 5,094,325 | A | * | 3/1992 | Smith ..................... 188/282.1 |
| 5,219,152 | A | * | 6/1993 | Derrien et al. ........... 267/64.16 |
| 5,246,247 | A | | 9/1993 | Runkel |
| 5,413,030 | A | | 5/1995 | Richardson et al. |
| 5,624,105 | A | * | 4/1997 | Runkel .................... 267/64.25 |
| 6,131,709 | A | | 10/2000 | Jolly et al. |
| 6,142,495 | A | | 11/2000 | Kim |
| 6,161,853 | A | | 12/2000 | Jung |
| 6,213,261 | B1 | | 4/2001 | Kunkel |
| 2002/0109327 | A1 | | 8/2002 | Timoney et al. |

FOREIGN PATENT DOCUMENTS

| | | |
|---|---|---|
| DE | 1 802 193 | 8/1970 |
| DE | 30 27 124 | 2/1981 |
| DE | 39 02 743 C1 | 7/1990 |
| EP | 0 529 320 A1 | 3/1993 |
| EP | 0 425 885 B1 | 7/1994 |
| EP | 0 677 679 | 7/1998 |
| EP | 0 980 772 | 2/2000 |
| EP | 1 231 085 A2 | 8/2002 |
| JP | 62-64603 | 3/1987 |
| WO | 03/106202 A1 | 12/2003 |

* cited by examiner

US 7,766,136 B2

SUSPENSION ARRANGEMENT FOR MOTOR VEHICLES

CROSS REFERENCE TO RELATED APPLICATION

This application claims priority to German patent application number 20 2005 011 439.1, filed Jul. 18, 2005.

FIELD OF THE INVENTION

The present invention relates to a suspension arrangement according to the preamble of claim 1 for load-bearing and resilient spring support in a motor vehicle.

BACKGROUND AND SUMMARY OF THE INVENTION

Figure 5:
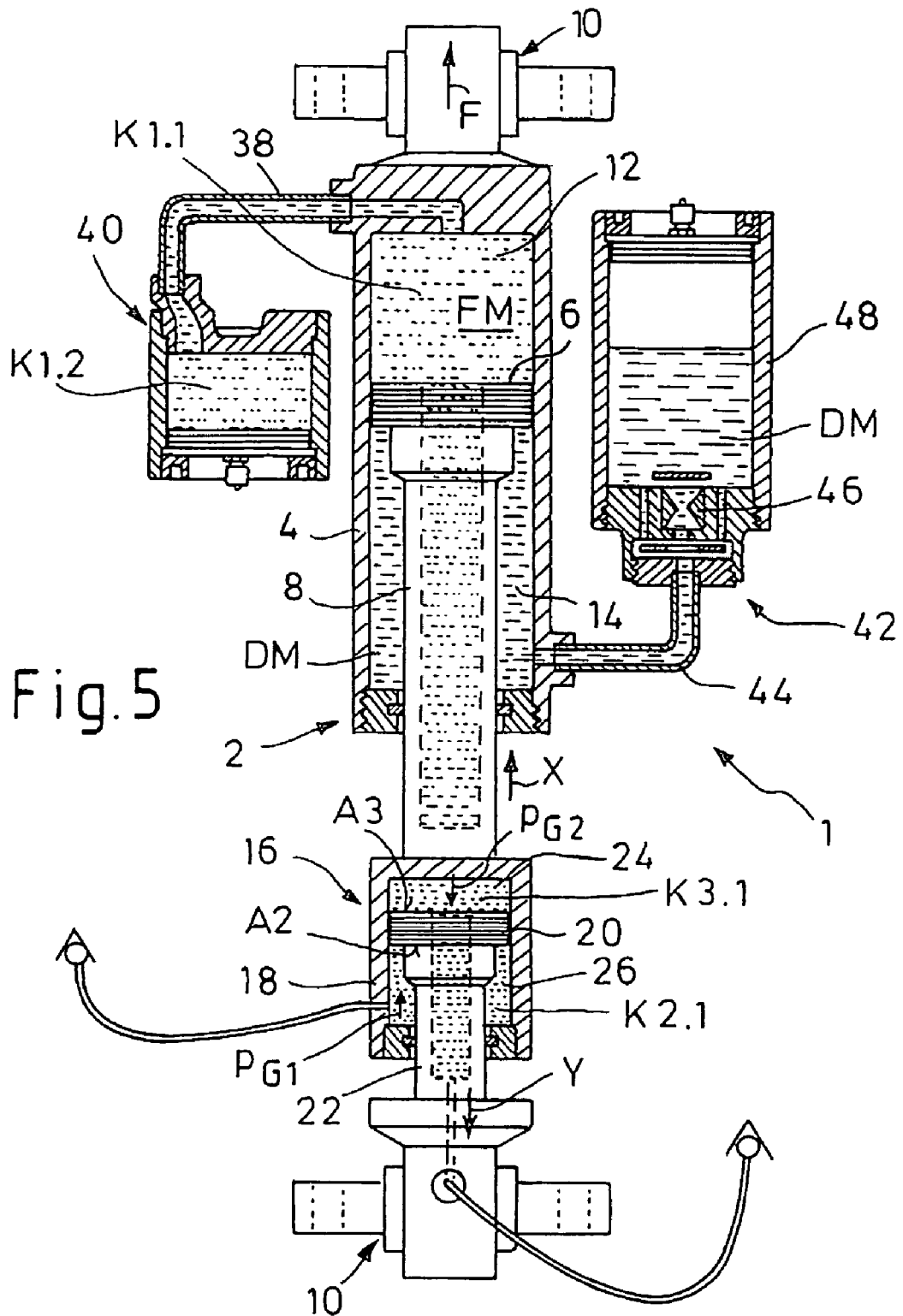

A suspension arrangement of the above-referenced type is generally known, for example, from EP 0 425 885 B1 (from FIG. 5 onward). This suspension arrangement is a hydropneumatic suspension system, the cylinder chamber and the annular chamber of the spring cylinder being connected in each case to a hydropneumatic spring accumulator, so that a pneumatic pressure acts indirectly in each case, via a hydraulic medium, on both sides of the piston of the spring cylinder. This gives rise to two forces which act on the piston in opposite directions and the difference between which gives a load-bearing force for supporting the load.

The known suspension system has proven very successful in practice. However, pneumatic suspension generally have the disadvantage that changes in ambient temperature influence the pressure of a pneumatic spring medium to an extremely pronounced extent, so that the load-bearing and spring properties likewise change in a temperature-dependent manner. This also applies to the vehicle level in the static state. In the case of the suspension system according to EP 0 425 885 B1, this temperature influence is indeed reduced somewhat, because two pressures act on the piston of the spring cylinder in opposite directions. However, there is still a need for improvement.

The object of the present invention is thus to improve a suspension arrangement of the type mentioned such that, in practice, the use properties are not dependent on temperature fluctuations. This applies, in particular, to a static level position of the spring cylinder, in order that the respective vehicle level remains more or less constant at different temperatures.

It is provided according to the invention that an additional spring cylinder is arranged in the region of the piston rod of the spring cylinder such that the piston rod can be telescopically changed in length. The additional spring cylinder comprises an additional cylinder and an additional piston which is guided therein and has an additional piston rod guided in the outward direction, the additional spring cylinder with these constituent parts forming part of the piston rod. It is preferred here for the additional cylinder to be connected in a fixed (rigid) manner to the piston-side part of the piston rod, while the outwardly guided additional piston rod in practice forms, by way of its free end, the end of the variable-length piston rod and, for this purpose, has an end connecting element for vehicle-mounted connection. However, the additional spring cylinder may also be arranged the other way round, i.e. it is possible for the additional piston rod to be connected to the piston rod and for the additional cylinder to be connected to the connecting element of the vehicle.

According to the invention here, the additional spring cylinder is subjected at least to a counterpressure of an elastically compressible, in particular pneumatic opposing spring medium, in the region of an additional annular chamber and/or of an additional working chamber. This design makes it possible, in dependence on the load occurring in the respective application case, for the working pressure, the counter pressure and those surfaces of the piston and of the additional piston which are subjected to these pressures to be configured such that in a static state subjected to the action of the load, on the one hand, the piston is located in an extension end stop relative to the cylinder, and, on the other hand, the additional piston is located in a compression end stop relative to the additional cylinder. In this static position, in the case of an increase in temperature, the thus likewise increasing pressures advantageously does not result in a change in the static level. In the case of a dynamic compression movement from the static position, only the piston is moved into the cylinder, counter to the working pressure, while the additional piston remains in its compression end stop in the additional cylinder. In the case of a dynamic extension movement out of the static position, the piston is located in its extension end stop, and only the additional piston moves, by way of the additional piston rod, in the extension direction in the additional cylinder.

Figure 1:
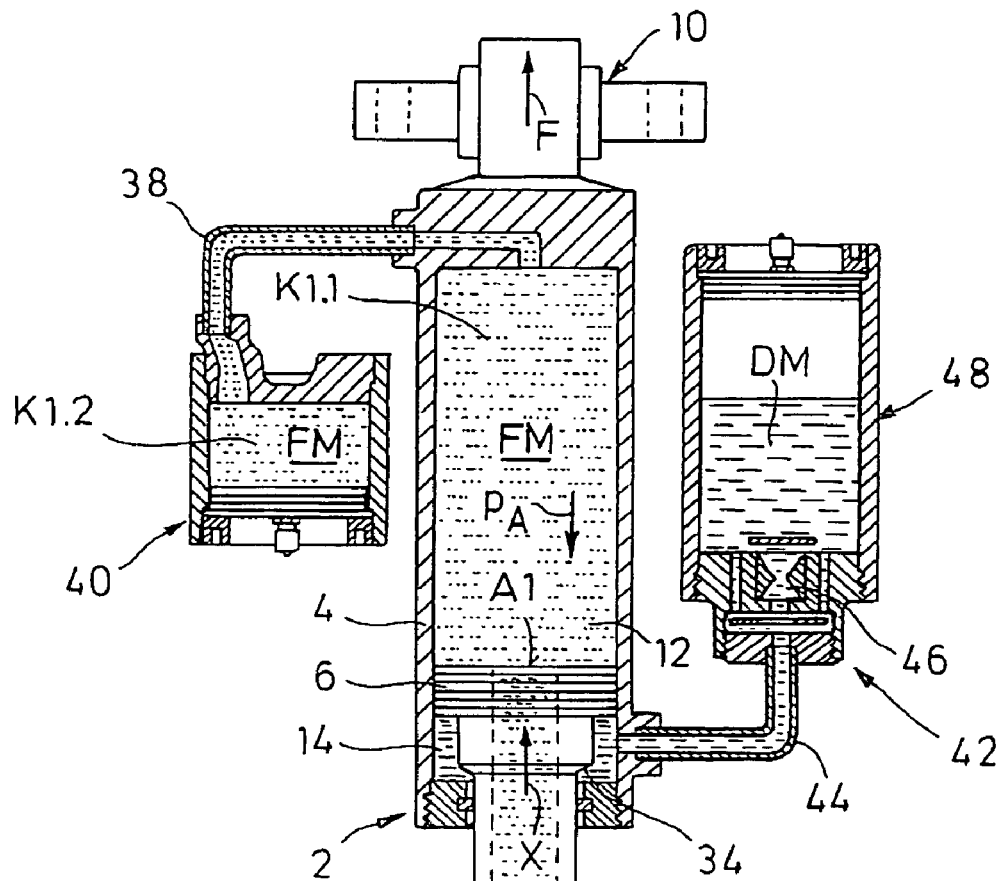
Figure 1:
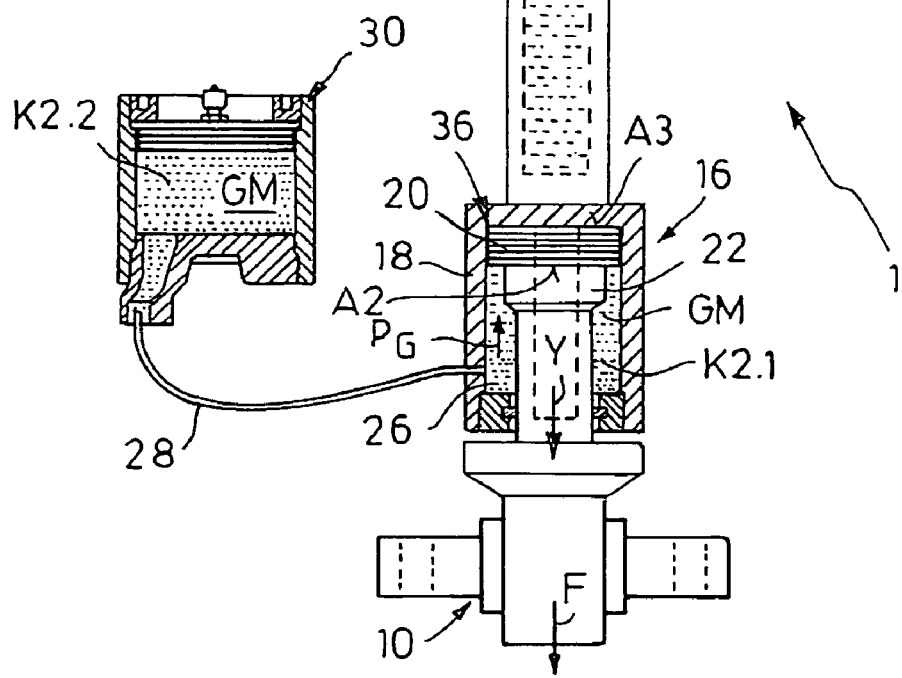
Figure 2:
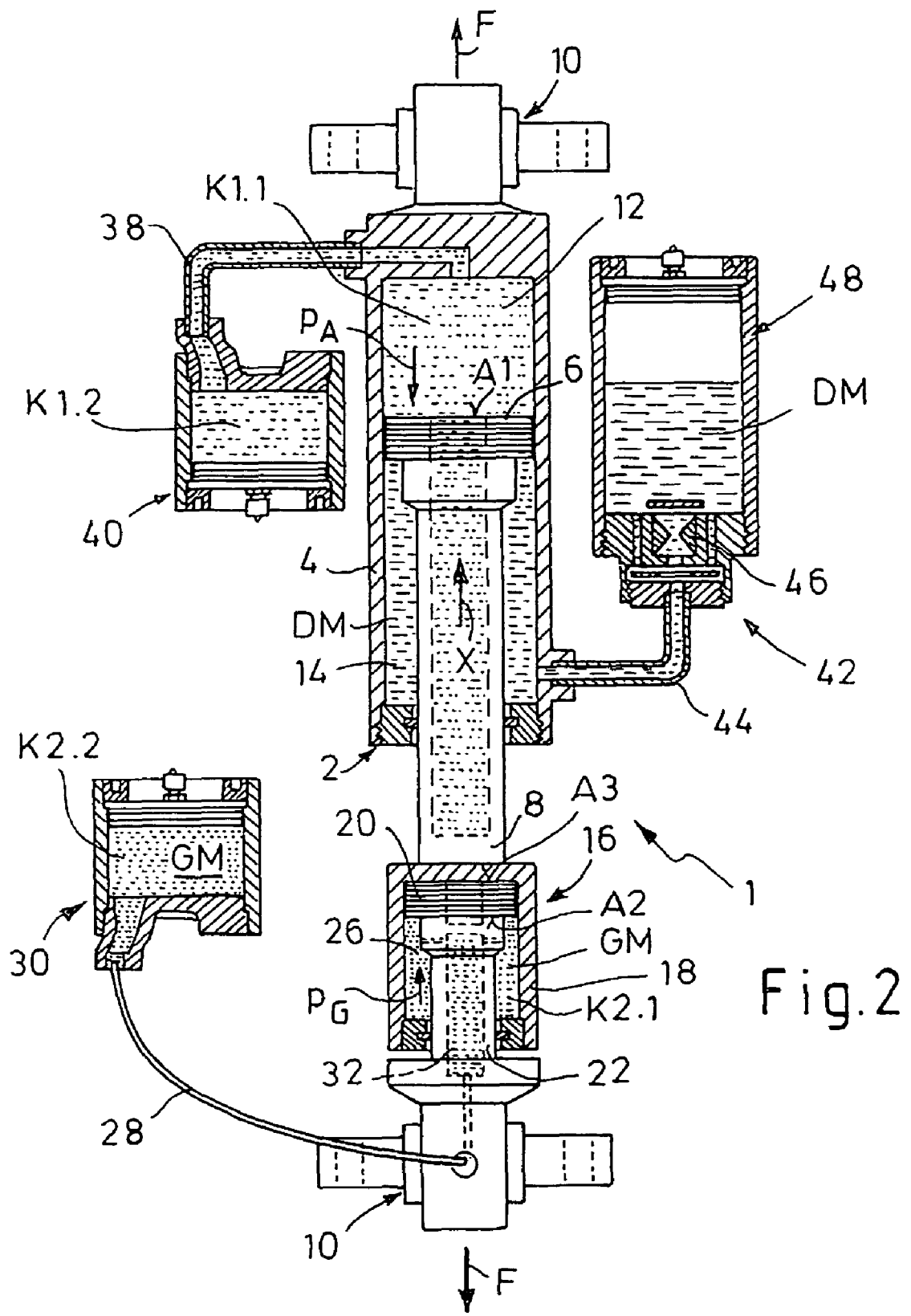
Figure 3:
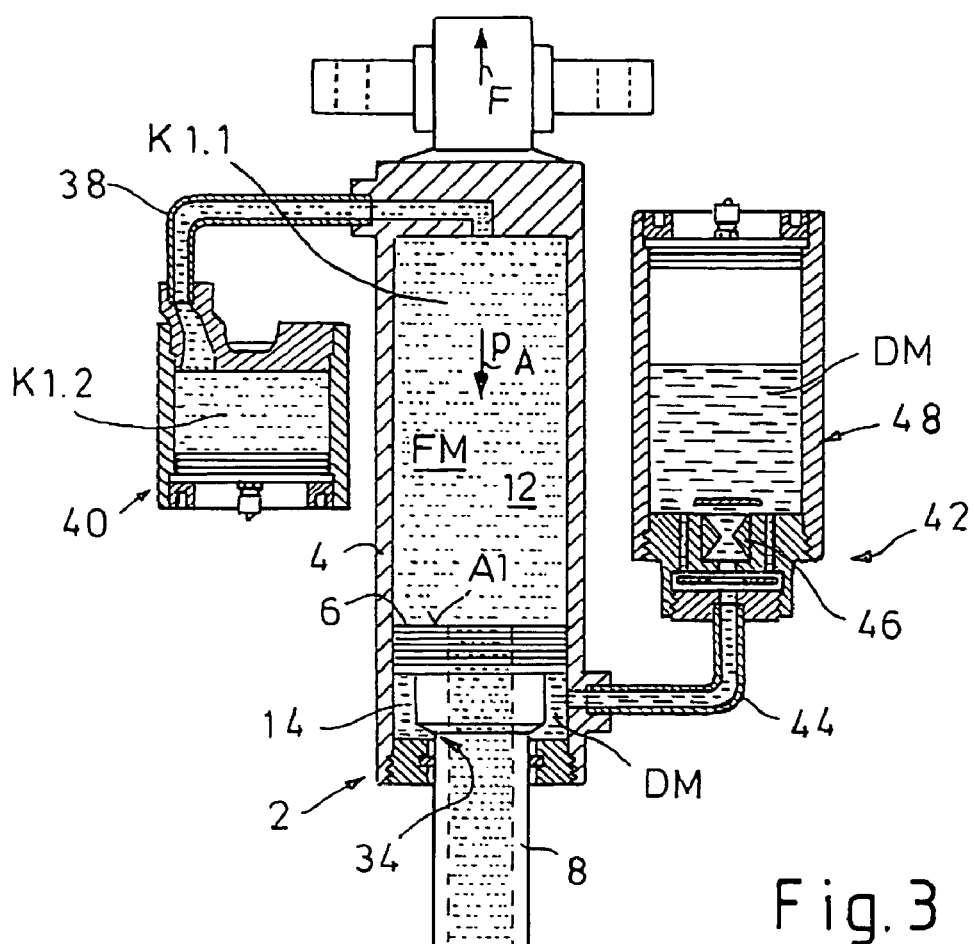
Figure 3:
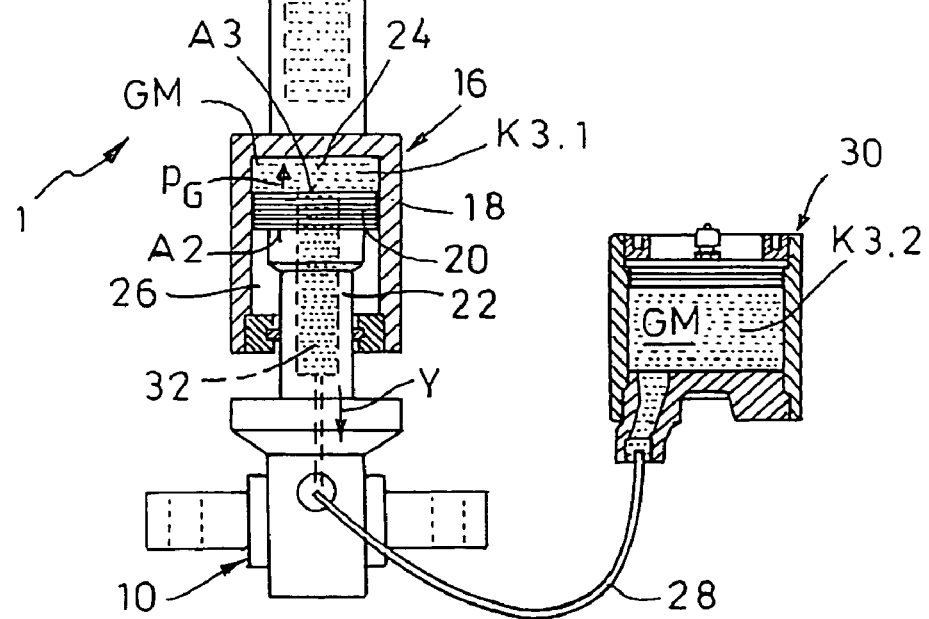
Figure 4:
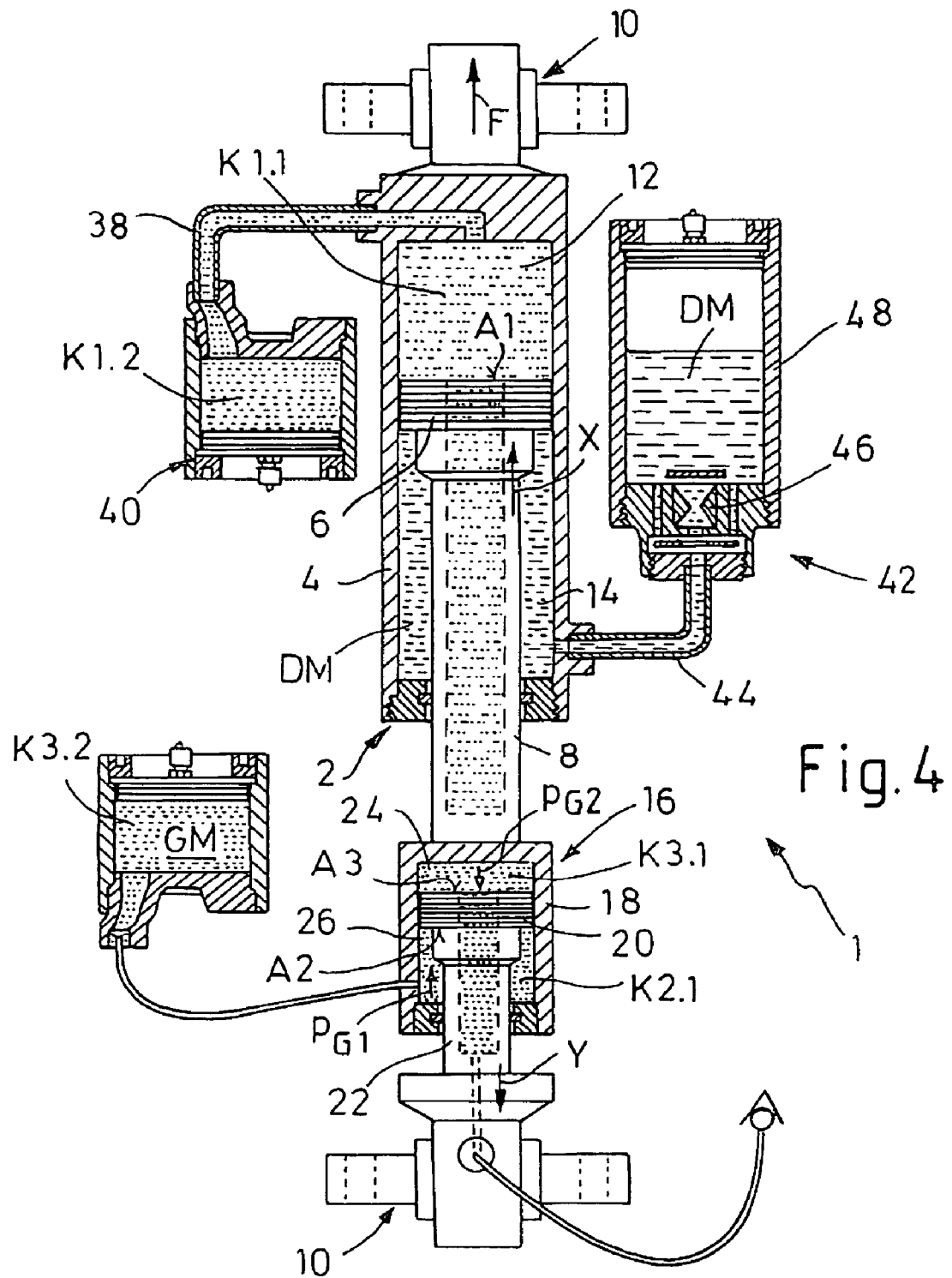

The invention will be explained in more precise detail with reference to preferred exemplary embodiments illustrated in the drawing, in which:

FIG. 1 shows a first embodiment of a suspension arrangement according to the invention with the components illustrated in axial section, with the suspension arrangement in a static position, FIG. 2 shows the suspension arrangement according to FIG. 1 in a state in which it has been compressed out of the static position and showing a second embodiment of the invention, FIG. 3 shows a second alternative embodiment of the suspension arrangement according to FIG. 1 in a state in which it has been extended out of the static position, FIG. 4 shows a third embodiment of the suspension arrangement in a certain suspension state, and FIG. 5 shows a variant of the embodiment according to FIG. 4 in a corresponding position.

DETAILED DESCRIPTION OF THE INVENTION

Parts and components which are identical or correspond to one another in functional terms are always provided with the same designations in the various figures of the drawings.

A suspension arrangement 1 according to the invention comprises (at least) one spring cylinder assembly 2 which, for its part, comprises, in a telescopic manner, a cylinder 4 and a piston 6 which is guided in the latter such that it can be displaced in a linear manner and which has a piston rod 8. The piston rod 8 is guided out of the cylinder 4 in the outward direction, in a circumferentially sealed manner, on one side. The spring cylinder assembly 2 is provided for arranging directly between a mass which is not resiliently mounted (vehicle wheel or axle) and a mass which is resiliently mounted (vehicle frame or bodywork). For this purpose, the cylinder 4 and the piston rod 8 have suitable connecting elements 10 at their mutually opposite ends remote from one another.

The piston 6 butts against the inner surface of the cylinder 4 via (at least) one circumferential seal. The piston 6 thus separates, within the cylinder 4, a cylindrical working chamber 12 from an annular chamber 14, which encloses the piston rod 8. On the side of the working chamber 12, in order to generate a spring force F which bears the respective load, the piston 6 acts by way of its working surface A1, which is directed toward this working chamber, against a working pressure pA of an elastically compressible, in particular pneumatic spring medium FM (for example nitrogen).

According to the invention, the piston rod 8 is designed to be telescopically variable in length via an additional spring cylinder assembly 16. In this case, the additional spring cylinder assembly 16 is subjected to at least one counterpressure pG of an elastically compressible, in particular likewise pneumatic opposing spring medium GM.

The additional spring cylinder assembly 16 comprises an additional cylinder 18 and an additional piston 20 which is guided therein such that it can be moved relative to the latter and has an additional piston rod 22 which is guided out of the additional cylinder 18 in the outward direction in a circumferentially sealed manner. In the preferred embodiments, the additional cylinder 18 is connected in a rigid manner to the piston rod 8 of the spring cylinder 2, while, at its free end, the additional piston rod 22 has the connecting element 10 for vehicle-mounted connection.

The additional piston 20 butts against the inner wall of the additional cylinder 18 via a circumferential seal, preferably comprising a plurality of sealing rings, and thus separates, within the additional cylinder 18, a cylindrical additional working chamber 24 (see FIGS. 3 to 5 in this respect) from an additional annular chamber 26, which encloses the additional piston rod 22.

In the embodiment according to FIGS. 1 and 2, the additional annular chamber 26 is subjected directly to the action of the opposing spring medium GM and is preferably additionally connected to an external accumulator 30 via a line 28. According to FIG. 1, the line 28 opens out directly into the additional annular chamber 26 through a radial opening in the wall of the additional cylinder 18, while, in the variant according to FIG. 2, the line 28 opens out into a cavity 32 of the additional piston rod 22 via channels and/or bores (which are merely indicated) of the connecting element 10 and/or of the additional piston rod 22. This cavity is connected to the additional annular chamber 26 via radial transverse bores (which are likewise merely indicated) of the additional piston rod 22.

In the case of the variant according to FIG. 3, the additional working chamber 24 is subjected directly to the action of the opposing spring medium GM and is also preferably connected to an external accumulator 30 via a line 28. In a similar manner to FIG. 2, the line 28 opens out into a cavity 32 of the additional piston rod 22, although the cavity 32 is open axially in the direction of the additional working chamber 24.

In the embodiments according to FIGS. 4 and 5, both the additional working chamber 24 and the additional annular chamber 26 are subjected to the action of the opposing spring medium GM. This gives rise to a resultant force from the difference between two oppositely directed partial forces resulting from the pressures pG1 and pG2.

On the side of the additional annular chamber 26, the additional piston 20 has an annular surface A2 which can be subjected to pressure and, on the side of the additional working chamber 24, the entire end surface A3 of the additional piston can be subjected to pressure.

Provision is made here according to the invention, in dependence on the load which is to be expected in the respective application case, for the working pressure pA, the counterpressure pG (or pG1, pG2) and those surfaces A1 and A2 and/or A3 of the piston 6 and of the additional piston 20 which are subjected to these pressures in each case to be configured such that in the static state illustrated in FIG. 1, on the one hand, the piston 6 is located in an extension end stop 34 relative to the cylinder 4 and, on the other hand, the additional piston 20 is located in a compression end stop 36 relative to the additional cylinder 18. The extension end stop 34 here is formed by an annular step of the piston rod 8, this annular step ending up in abutment against an annular collar of the cylinder 4. In the compression end stop 36, the additional piston 20 has its end surface A3 butting against the additional cylinder 18.

When the spring cylinder 2 is dynamically compressed, in accordance with FIG. 2, from the static position according to FIG. 1, only the piston 6 moves, via the piston rod 8, in the cylinder 4, counter to the working pressure pA. The additional piston 20 remains in its compression end stop 36. In the case of a compression movement in arrow direction X, the piston 6 is thus only subjected to the actual load-bearing spring force $F=pA \cdot A1$.

FIG. 3 illustrates a dynamic extension movement out of the static position. In this case, the piston 6 remains in its extension end stop 34 in the cylinder 4. Only the additional piston 20 moves, by way of the additional piston rod 22, in arrow direction Y, that is to say the extension direction. If, according to FIGS. 1 and 2, the additional annular chamber 26 is subjected to the action of the opposing spring medium GM, the opposing force pG increases as a result of compression during extension, which results in extension damping. In the case of the embodiments according to FIGS. 4 and 5, the effect depends on the ratio of the respective pressures in the chambers 24 and 26.

In the case of the preferred embodiments illustrated, the working chamber 12 of the cylinder 4 is filled directly with the compressible spring medium FM. The working chamber 12 here is preferably connected to an external accumulator 40 via a line 38, the working chamber 12 containing a first volume K1.1 of the spring medium FM and the accumulator 40 containing a second volume K1.2 of the spring medium FM. Furthermore, the opposing spring medium GM is also preferably arranged with a first volume K2.1 in the additional annular chamber 26 and with a second volume K2.2 in the accumulator 30 (FIGS. 1 and 2) and/or with a first volume K3.1 in the additional working chamber 24 and a second volume K3.2 in the accumulator 30 (FIGS. 3 and 4).

As an alternative to these preferred embodiments, indirect pressure activation via a hydraulic medium would also be possible in each case (hydropneumatic embodiment).

In the preferred embodiments, the annular chamber 14, which encloses the piston rod 8 within the cylinder 4, is advantageously a constituent part of a hydraulic damping arrangement 42. For this purpose, the annular chamber 14 is filled with a hydraulic damping medium DM and is connected to an external accumulator 48 via a line 44 and a damping valve 46. FIGS. 1 and 2 demonstrate that dynamic suspension movements of the piston 6 result in changes in volume of the annular chamber 14, so that hydraulic medium DM flows via the damping valve 46 in each case. Suitable configuration of the damping valve 46 makes it possible to achieve different damping forces during compression and extension.

As an alternative, it would also be possible for air to be admitted to the annular chamber 14, i.e. for the annular chamber to be connected to the atmosphere and thus to be, in principle, functionless.

The invention gives rise, in part, to the advantage that the spring action is divided up between two pneumatic springs. The respective spring volume thus has a "rest" when the movement takes place in the region of the respectively other volume. The temperature of the respective medium is thus advantageously kept low since each volume is compressed to a lesser extent.

In respect of the embodiment according to FIG. 3, it should also be mentioned that the pressure of the volume K3.1 can be set such that, by virtue of acting on the surface A3 of the additional piston 20, this pressure gives rise to a force which is equal to the force which results from the pressure pA of the volume K1.1 in the working chamber 12 and to which the piston 6 is subjected in the static position. It is thus advantageously possible for the additional piston 20 to position itself in a virtually impact-free manner on the mechanical compression end stop 36 during a compression movement.

The embodiment according to FIG. 4, in practice, constitutes a combination of the previous embodiments according to FIGS. 1 to 3. It is thus likewise possible to reduce expansion and minimize the mechanical impact. FIG. 5 illustrates that it is also possible to have an embodiment without an additional accumulator in the region of the additional spring cylinder 16. The volumes K2.1 and/or K3.1 are merely incorporated (enclosed) in the chambers 26 and 24. As can be gathered from the illustrations in FIGS. 4 and 5, in contrast to the static position according to FIG. 1, it is also possible to provide a pressure configuration such that, in the static position, the piston 6 and additional piston 20 are arranged in a "floating" manner, i.e. are spaced apart from the mechanical stops 34 and 36.

While the above description constitutes the preferred embodiment of the present invention, it will be appreciated that the invention is susceptible to modification, variation, and change without departing from the proper scope and fair meaning of the accompanying claims.

The invention claimed is:

1. A hydro-pneumatic suspension arrangement for load-bearing and resilient wheel support in a motor vehicle, comprising at least one first spring cylinder assembly with a first piston which is guided in a first cylinder such that the first piston can be moved within the first cylinder, the first piston having on one side thereof, a first piston rod guided to extend out of the first cylinder such that the first piston separates, within the first cylinder, a first cylindrical working chamber from a first annular chamber which encloses the first piston rod, in order to generate a load-bearing spring force (F), the first piston acts counter to a working pressure (pA) of an elastically compressible first volume of a pneumatic spring medium (FM), the first piston rod being telescopically variable in length through a second spring cylinder assembly being subjected at least to a counterpressure of an elastically compressible second volume of a pneumatic opposing spring medium (GM), wherein the second spring cylinder assembly has a second piston which is guided in a second cylinder such that the second piston can be moved relative to the second cylinder and a second piston rod, which is formed on one side of the second piston, is guided to extend out of the second cylinder, and wherein the working pressure (pA), the counterpressure, and surfaces of the first and second pistons subject respectively to the working pressure (pA) and the counterpressure are cooperatively configured such that use properties, including a static level position of the hydro-pneumatic suspension arrangement including both the first and second spring cylinder assemblies, remain substantially constant at different temperatures, wherein the second piston separates, within the second cylinder, a cylindrical second working chamber from a second annular chamber, and the second annular chamber is subjected to the action of the second volume of the pneumatic opposing spring medium (GM).

2. A hydro-pneumatic suspension arrangement for load-bearing and resilient wheel support in a motor vehicle, comprising at least one first spring cylinder assembly with a first piston which is guided in a first cylinder such that the first piston can be moved within the first cylinder, the first piston having on one side thereof, a first piston rod guided to extend out of the first cylinder such that the first piston separates, within the first cylinder, a first cylindrical working chamber from a first annular chamber which encloses the first piston rod, in order to generate a load-bearing spring force (F), the first piston acts counter to a working pressure (pA) of an elastically compressible first volume of a pneumatic spring medium (FM), the first piston rod being telescopically variable in length through a second spring cylinder assembly being subjected at least to a counterpressure of an elastically compressible second volume of a pneumatic opposing spring medium (GM), wherein the second spring cylinder assembly has a second piston which is guided in a second cylinder such that the second piston can be moved relative to the second cylinder and a second piston rod, which is formed on one side of the second piston, is guided to extend out of the second cylinder, and wherein the working pressure (pA), the counterpressure, and surfaces of the first and second pistons subject respectively to the working pressure (pA) and the counterpressure are cooperatively configured such that use properties, including a static level position of the hydro-pneumatic suspension arrangement including both the first and second spring cylinder assemblies, remain substantially constant at different temperatures, wherein the second piston separates, within the second cylinder, a cylindrical second working chamber from a second annular chamber, and the second working chamber is subjected to the action of the second volume of the pneumatic opposing spring medium (GM).

3. A hydro-pneumatic suspension arrangement for load-bearing and resilient wheel support in a motor vehicle, comprising at least one first spring cylinder assembly with a first piston which is guided in a first cylinder such that the first piston can be moved within the first cylinder, the first piston having on one side thereof, a first piston rod guided to extend out of the first cylinder such that the first piston separates, within the first cylinder, a first cylindrical working chamber from a first annular chamber which encloses the first piston rod, in order to generate a load-bearing spring force (F), the first piston acts counter to a working pressure (pA) of an elastically compressible first volume of a pneumatic spring medium (FM), the first piston rod being telescopically variable in length through a second spring cylinder assembly being subjected at least to a counterpressure of an elastically compressible second volume of a pneumatic opposing spring medium (GM), wherein the second spring cylinder assembly has a second piston which is guided in a second cylinder such that the second piston can be moved relative to the second cylinder and a second piston rod, which is formed on one side of the second piston, is guided to extend out of the second cylinder, and wherein the working pressure (pA), the counterpressure, and surfaces of the first and second pistons subject respectively to the working pressure (pA) and the counterpressure are cooperatively configured such that use properties, including a static level position of the hydro-pneumatic suspension arrangement including both the first and second spring cylinder assemblies, remain substantially constant at different temperatures, wherein the second piston separates, within the second cylinder, a cylindrical second working chamber from a second annular chamber, and both the second working chamber and the second annular chamber are subjected to the action of the second volume of the opposing spring medium (GM).

4. A hydro-pneumatic suspension arrangement for load-bearing and resilient wheel support in a motor vehicle, comprising at least one first spring cylinder assembly with a first piston which is guided in a first cylinder such that the first piston can be moved within the first cylinder, the first piston having on one side thereof, a first piston rod guided to extend out of the first cylinder such that the first piston separates, within the first cylinder, a first cylindrical working chamber from a first annular chamber which encloses the first piston rod, in order to generate a load-bearing spring force (F), the first piston acts counter to a working pressure (pA) of an elastically compressible first volume of a pneumatic spring medium (FM), the first piston rod being telescopically variable in length through a second spring cylinder assembly being subjected at least to a counterpressure of an elastically compressible second volume of a pneumatic opposing spring medium (GM), wherein the second spring cylinder assembly has a second piston which is guided in a second cylinder such that the second piston can be moved relative to the second cylinder and a second piston rod, which is formed on one side of the second piston, is guided to extend out of the second cylinder, and wherein the working pressure (pA), the counterpressure, and surfaces of the first and second pistons subject respectively to the working pressure (pA) and the counterpressure are cooperatively configured such that use properties, including a static level position of the hydro-pneumatic suspension arrangement including both the first and second spring cylinder assemblies, remain substantially constant at different temperatures, wherein the second piston separates, within the second cylinder, a cylindrical second working chamber from a second annular chamber, and the second annular chamber or the second working chamber is connected to an external accumulator.

5. A hydro-pneumatic suspension arrangement for load-bearing and resilient wheel support in a motor vehicle, comprising at least one first spring cylinder assembly with a first piston which is guided in a first cylinder such that the first piston can be moved within the first cylinder, the first piston having on one side thereof, a first piston rod guided to extend out of the first cylinder such that the first piston separates, within the first cylinder, a first cylindrical working chamber from a first annular chamber which encloses the first piston rod, in order to generate a load-bearing spring force (F), the first piston acts counter to a working pressure (pA) of an elastically compressible first volume of a pneumatic spring medium (FM), the first piston rod being telescopically variable in length through a second spring cylinder assembly being subjected at least to a counterpressure of an elastically compressible second volume of a pneumatic opposing spring medium (GM), wherein the second spring cylinder assembly has a second piston which is guided in a second cylinder such that the second piston can be moved relative to the second cylinder and a second piston rod, which is formed on one side of the second piston, is guided to extend out of the second cylinder, and wherein the working pressure (pA), the counterpressure, and surfaces of the first and second pistons subject respectively to the working pressure (pA) and the counterpressure are cooperatively configured such that use properties, including a static level position of the hydro-pneumatic suspension arrangement including both the first and second spring cylinder assemblies, remain substantially constant at different temperatures, wherein the first annular chamber of the first spring cylinder assembly is part of a hydraulic damping arrangement.

6. The suspension arrangement as claimed in claim 5, wherein the first annular chamber is filled with a hydraulic damping medium (DM) and is connected to an external accumulator via a line and a damping valve.

\* \* \* \* \*